June 19, 1928.
D. M. SIMONS
CABLE STRUCTURE
Filed April 29, 1927
1,674,070
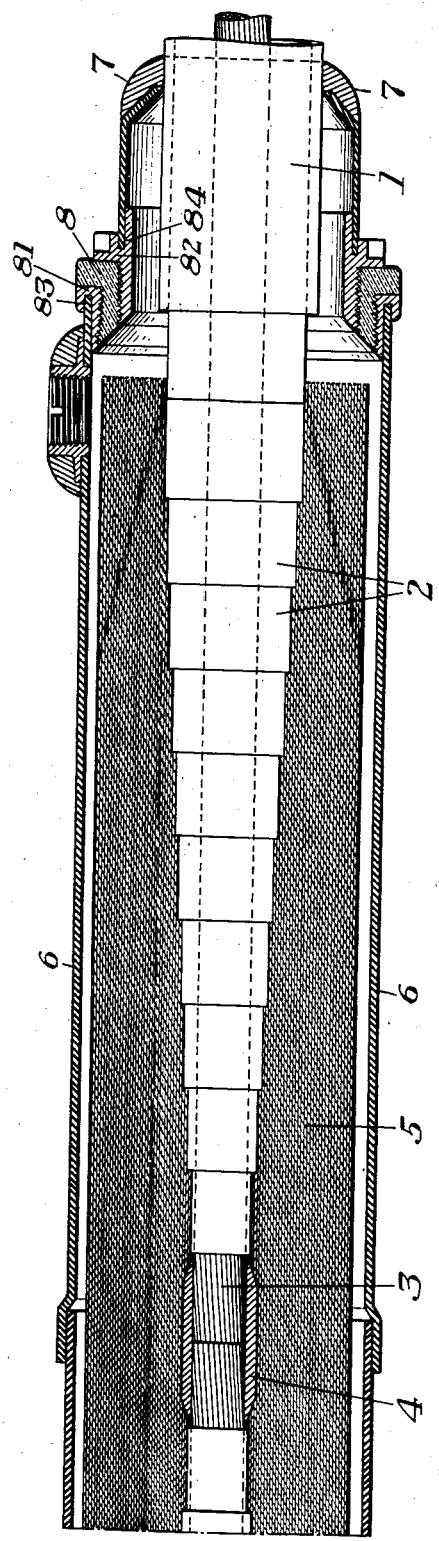
INVENTOR
Donald M. Simons
by Christy and Christy
his attorneys Patented June 19, 1928.

1,674,070

UNITED STATES PATENT OFFICE.

DONALD M. SIMONS, OF OSBORNE, PENNSYLVANIA, ASSIGNOR, BY MESNE ASSIGNMENTS, TO GENERAL CABLE CORPORATION, A CORPORATION OF NEW JERSEY.

CABLE STRUCTURE.

Application filed April 29, 1927. Serial No. 187,568.

My invention relates to underground electric cables, and specifically to lead-sheathed cables. The object of the invention is economy of operation associated with durability of structure.

In the accompanying drawing a cable and a portion of a junction box in which my invention is embodied, are shown in axial longitudinal section.

When a lead-sheathed, single-conductor cable, for example, is used for carrying an alternating current, the matter of induction loss in the lead sheath becomes a problem with which the engineer has to deal; and as the amount of current to be carried increases, the induction loss alluded to increases, at accelerated rate. The proposal has heretofore been made to interrupt at intervals the continuity of the lead sheath as a conductor, and so to diminish induction loss, but in carrying out the proposal the structure has been weakened mechanically to such degree as to forbid practical acceptance. My invention lies in a structure mechanically strong and adequate, in which is accomplished the proposal of breaking the electrical continuity of the lead sheath.

I conveniently effect the break of electrical continuity in the structure of the joint casing. A cable when laid is ordinarily jointed at intervals of four hundred feet more or less and breakage of electrical continuity at intervals no greater than that, is adequate to give relief from excessive induction loss.

In the drawing 1 indicates the sheathed cable end. The sheath is cut away, exposing the insulation 2, and the insulation is cut away, exposing the conductor end 3. The conductor is united with the conductor end of a companion length of cable by the union 4. The joint so formed is surrounded with insulation 5, and the whole is enclosed in a joint casing 6.

The joint casing is essentially a cylindrical casing of metal, of greater diameter than the cable and of a length sufficient to bridge the space at which the cut-away ends of the cable sheath stand apart. At its ends the joint casing is adapted for union with the cable sheath and in this instance it is shown to be reduced in diameter at the end, that it may be united with the cable sheath by the wiper solder joint 7. In this instance the joint casing is shown to be provided with an orifice through which when installation is effected all the inner spaces may be flushed with liquid insulating compound.

My invention is found in an annulus 8 inlaid in the junction box wall. The annulus includes a body of insulation, of bakelite for example, or it might be of porcelain, to which the numeral 8 is immediately applied, and bodies of metal, preferably of brass, 81 and 82, overlying and secured upon the opposite inner and outer cylindrical surfaces of the body 8. The union of these inner and outer brass rings upon the central ring of bakelite or equivalent material may be made tight and strong. In the case of a moldable material, the material may be shaped between the coaxially and oppositely placed rings of brass, and in such case the surfaces of the rings upon which the insulating material is molded may be corrugated or otherwise roughened to make the union of the parts more secure. Alternately, the ring of insulating material may be independently formed, and to the preformed ring of insulation the inner and outer brass rings may be applied, and the union of these parts may in such case be a screw-threaded union.

The joint casing is made in sections to admit of the introduction of this annulus, and the outer and inner brass rings 81 and 82 may be particularly shaped for union of the sections of the casing with them. In this instance the two rings are provided with grooves or channels 83 and 84 in which the edges of the casing sections may be seated and where these edges may be secured. The joint casing is ordinarily formed of lead and it is apparent that these edges of the lead casing sections seated in the grooves 83 and 84 may be sweated to secure union of the parts.

The surfaces of the annulus over which union is effected are the inner and outer surfaces of the annulus and are accordingly opposite coaxial surfaces; they extend longitudinally of the structure, parallel with the cable axis. Because of such position they may be prolonged indefinitely and will be prolonged sufficiently to afford secure union, and it is by this disposition of the meeting surfaces that the inlay of insulation is made mechanically adequate, and the proposal of an inlay is made practicable.

It will be remarked that the body 8 of insulation particularly shaped as the drawings show, presents exteriorly a more widely extended surface than interiorly. The reason for this is that the interior surface is submerged in liquid insulation while the exterior surface is exposed to varying conditions, and accordingly it is desirable that externally the interval across which leakage tends to pass shall be the wider. The surfaces otherwise are minutely shaped according to the teaching of the art.

While it is true that induction losses are greatest in single-conductor cables, they are not unknown in cables of other kinds; and, manifestly, the structure described is applicable to cables, regardless of the number of contained conductors. It may be employed wherever the continuity of the sheath as a conductor is to be interrupted and mechanical security still maintained.

I claim as my invention:

1. A three-part junction-box casing for an electric cable, two of said parts consisting essentially of metal cylinders and the third consisting of a cylinder of insulation faced over both its inner and outer cylindrical surfaces with cylinders of metal with which the insulation is united in mechanically secure and hermetically tight union, the two parts of the casing first named being adapted to be secured mechanically the one to the inner and the other to the outer metal cylinder of the third part.

2. A three-part junction-box casing for an electric cable, two of said parts consisting essentially of metal cylinders and the third consisting of a cylinder of insulation faced interiorly and exteriorly with metal, the two bodies which constitute the metal facings of the cyilnder of insulation being provided each with an encircling groove adapted to receive the ends of the two said metal cylinders.

In testimony whereof I have hereunto set my hand.

DONALD M. SIMONS